March 29, 1932. E. A. TRAGER 1,851,878
FLASH GUN
Filed Jan. 3, 1929
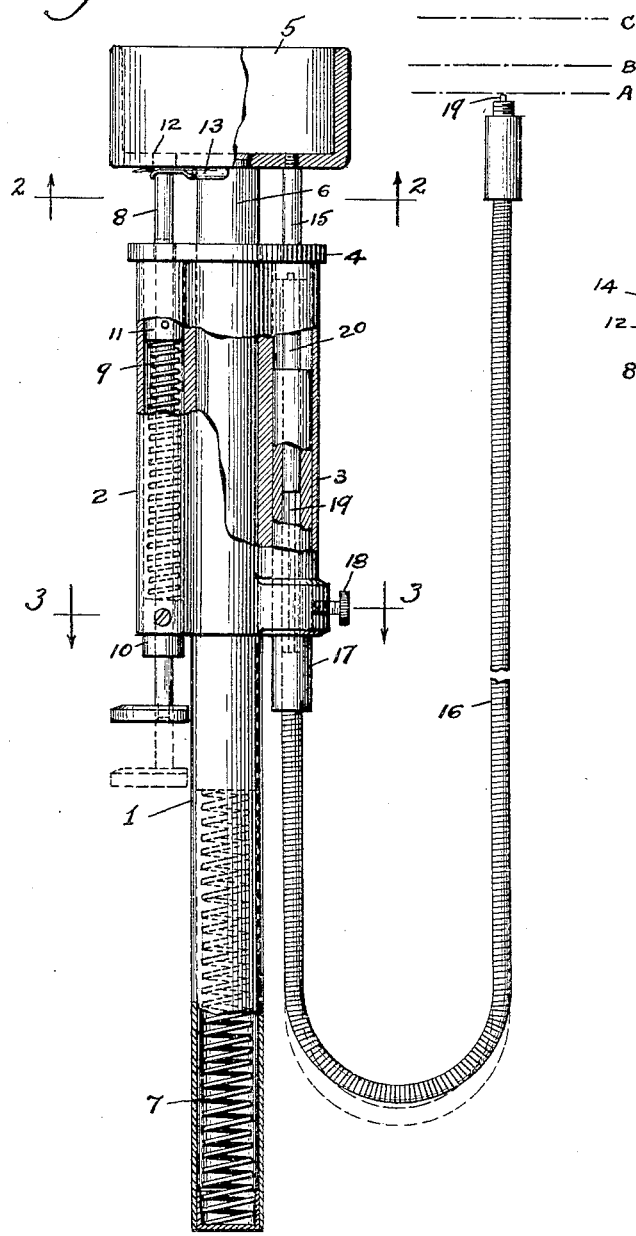
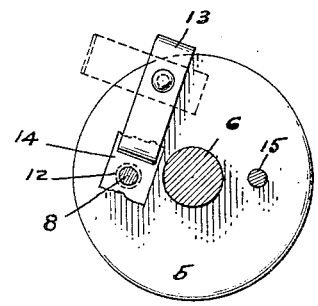
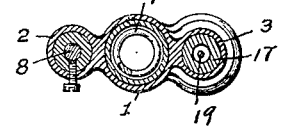
Inventor:-
Edward A. Trager
By:-

Patented Mar. 29, 1932

1,851,878

UNITED STATES PATENT OFFICE

EDWARD A. TRAGER, OF CHICAGO, ILLINOIS

FLASH GUN

Application filed January 3, 1929. Serial No. 330,029.

This invention relates to an improved automatic flash gun for use in the photographic art, or in other arts where an instantaneous flash of intense light is desired.

Referring particularly to the art of photography, it is very desirable that the camera shutter is opened at the precise moment of most intense illumination when a flash is exploded, and this invention provides an automatic shutter release that will operate when the flash is at highest intensity. This permits the photographer to direct his attention to the composition and arrangement of his picture and relieves his mind from the effort to bring about perfect synchronization of the flash and the opening of the camera shutter.

The device is arranged to be held in the hand and directed in any desired direction relative to the subject being photographed. An automatic trip device is held from operation by the thumb of the hand holding the device and can thereby be released instantly when the time arrives for making the exposure when it explodes a percussion cap and fires the flash. The exact operation of this act and the tripping of the camera shutter will be more fully described as the narrative progresses.

Reference now being had to the accompanying drawings where the invention is clearly illustrated and wherein the several parts and elements are shown in their preferred form but do not necessarily illustrate the final structure that may be adopted, neither are they necessarily drawn to scale. I also wish it understood that I consider myself entitled to any modifications or changes in the arrangement of the operative elements that may be applied to like devices and that fall within the scope and meaning of the claims appended.

Figure 1 shows a side view partly in section of my improved automatic flash gun and showing in dotted lines different positions of some of the operative parts.

Figure 2 is a sectional plan taken on approximately the line 2—2 of Figure 1 and illustrates clearly the device for holding the percussion cap by means of which the charge of powder is exploded.

Figure 3 is a sectional plan taken on approximately the line 3—3 of Figure 1 and illustrates the arrangement of the parts shown.

The basic principle of operation involved in this invention is the utilization of the explosive recoil of the powder charge to automatically operate the camera shutter at the precise instant of highest light intensity, this is accomplished in the following manner.

The main housing for the flash gun comprises a hollow casing 1 with auxiliary housings 2 and 3 secured to the upper end of the casing 1 and terminating in a head 4. A flash powder holder 5 is mounted on a stem 6 extending down into the hollow stem 1 and resting on a retarding spring 7 which spring normally holds the flash head in the position of Figure 1.

The auxiliary housing 2 carries the percussion rod 8 which extends entirely through the housing, the upper end acting as the percussion element and the lower end terminating in a thumb piece by means of which the action of the rod is controlled. A spring 9 is mounted on the rod 8 within the housing 2 and finds abutment against the collars 10 and 11, the collar 10 being secured to the lower end of the housing 2 and the collar 11 being secured to the rod 8 so that when the rod is pulled away from the flash head 5 the spring 9 is compressed and forms the motive power for exploding the percussion cap that ignites the powder. The dotted lines indicate the position of the thumb piece on the lower end of the rod 8 when being held in what may be termed the cocked position.

The under side of the flash head 5 is provided with a hole 12 to permit entrance of the percussion end of the rod 8. Adjacent this hole 12 is a small clip 13 adapted to hold a percussion cap 14 in exploding position over the hole 12 where it may be exploded by the rod 8.

A long screw 15 is secured to the flash head 5 and extends into the upper end of the housing 3, the head forming a stop for the upward movement of the flash head 5 by resting against the under side of the top 4.

The camera shutter release 16 carries a hollow rod extension which is mounted inside the housing 3 and is held against movement by the set screw 18. The cable release wire 19 housed within the release 16 is secured to an enlarged rod end that is normally held against the screw head 15 so that the movement of the screw head will immediately start movement of the wire cable 19 when the flash head 5 begins to recoil after the powder is ignited.

The amount of movement required in different camera shutters to trip their mechanism varies, it is therefore necessary to provide sufficient movement in the release wire 19 to take care of the maximum requirements, but which may be much in excess of other shutters. To meet this condition I provide a specially constructed release housing 16 made of a coiled wire to enclose the cable 19. This coiled housing must be expansible as well as flexible, which condition does not exist in cable releases generally obtained on the market. The expansion must be lineal to accommodate the extra movement imparted to the wire 19 over that required to trip any individual shutter release lever. The wire 19 is given maximum movement each time the flash head recoils and the lineal expansion of the casing 16 must take place to accommodate this movement.

The dotted lines A, B and C of Figure 1 may indicate three positions required for the cable end to actuate three different camera shutters, while the distance from A to C may represent the maximum movement of the cable end if no shutter were present. For illustration we will suppose that the shutter in use requires a minimum movement of the cable 19 to operate it and make an exposure. This movement would then be represented by the line A. When the wire reaches the position of A it stops because the shutter has been tripped and the mechanism of the shutter will not permit it to move further. The power of recoil, however, of the flash head 5 is sufficient to drive the head its maximum movement and as a consequence the end of the wire in contact with the screw head 15 must continue its movement while the end at A must stand still, therefore, expansion must be provided in the wire housing to absorb this excess movement. The dotted lines at the lower loop in the cable housing 16 indicates how this expansion takes place and relieves the mechanism of the camera shutter from damage. This expansible cable release is a very important part of this invention and must be used if shutters with delicate mechanism are on the camera. The expansion of course takes place through a slight opening of the coils of the casing 16. A shutter requiring a movement to B will require less expansion and a shutter requiring a movement to C might not require any expansion in the cable housing 16.

*Operation*

In order to operate this flash gun substantially the following procedure would prevail.

A percussion cap would first be placed in the holder 13 and properly centered over the hole 12, or rather between the hole 12 and the striking rod 8 and the rod left resting on the cap, this closes the hole 12 against leakage of powder. The required charge of powder is now placed in the cup head 5. It is supposed of course that the cable release has been secured to the shutter to be operated. The striking rod 8 is now withdrawn and held in the dotted position of Figure 1 and the device elevated or pointed in the direction desired. When the time comes to explode the charge the thumb releases the rod 8 which through the driving force of the compressed spring 9 strikes the percussion cap 14 exploding it against the edges of the hole 12 and drives the fire up through the hole 12 into the mass of powder which immediately ignites with explosive force, and drives the head 5 back by the explosive recoil, the rod 8 now being at the end of its movement the head 5 moves down over the rod and carries the screw 15 down with it, moves the wire 19 and trips the shutter. The downward movement of the head 5 compresses the spring 7 which immediately returns the head 5 to its normal position as the power of the explosion is spent.

What I claim as new and desire to secure by Letters Patent is—

1. A combined flash gun and camera shutter release member comprising a flash powder container, a central stem depending therefrom, a casing into which said stem projects, a compression spring within said casing for holding said stem and container in an elevated position, a second stem depending from said powder container and passing into said casing parallel to said central stem, a camera shutter release member secured to said casing axially aligned with said second stem and adapted to be operated from the recoil of said powder container when powder is exploded therein.

2. A combined flash gun and shutter release device comprising a casing member having three parallel axially aligned openings therethrough, a powder container having two axially aligned depending stems adapted to pass into two of the openings in said casing, a percussion cap device carried by said container and a spring propelled striking member carried in the third opening in said casing the percussion cap device and the striking member being in operative alignment, a shutter release member secured in said casing in alignment with one of said stems and adapted to be operated thereby from the natural recoil of said container when powder is exploded therein.

3. A combined flash gun and shutter release device comprising a casing having a central and two side openings, a flash powder container carried by said casing and movable relative thereto, a shutter release stem secured to said powder container and passing into one of the side openings in said casing, a shutter release member also secured to said casing and positioned in axial alignment with said release stem and adapted to be operated thereby when powder is exploded in said container, a percussion cap member carried by said container and a striking member located in the other side opening of said casing and a spring for imparting movement to said striker to explode said cap whereby said container will move toward said casing by the natural recoil of the explosion.

4. A camera shutter release for use in connection with a recoil acting flash gun comprising a flexible solid wire extending from the flash gun to the said camera shutter, a coiled enclosure for said wire, said enclosure being capable of linear expansion when the shutter end of the wire reaches the end of its movement in said shutter and the flash gun end of the wire continues to move under the impact of the recoil of said flash gun.

In testimony whereof I affix my signature.

EDWARD A. TRAGER.